US010340055B2

(12) United States Patent
Murray et al.

(10) Patent No.: US 10,340,055 B2
(45) Date of Patent: Jul. 2, 2019

(54) EMULSIONS WITH IMPROVED STABILITY

(71) Applicant: ELANTAS PDG, INC., St. Louis, MO (US)

(72) Inventors: Thomas J. Murray, Chesterfield, MO (US); Bharathi Balagam, Olivette, MO (US)

(73) Assignee: ELANTAS PDG, INC., St. Louis, MO (US)

( * ) Notice: Subject to any disclaimer, the term of this patent is extended or adjusted under 35 U.S.C. 154(b) by 89 days.

(21) Appl. No.: 15/281,235

(22) Filed: Sep. 30, 2016

(65) Prior Publication Data

US 2017/0018328 A1 Jan. 19, 2017

Related U.S. Application Data

(62) Division of application No. 14/512,054, filed on Oct. 10, 2014, now abandoned.

(51) Int. Cl.
*H01B 19/02* (2006.01)
*H01B 19/04* (2006.01)
*B05D 1/02* (2006.01)
*C09D 135/02* (2006.01)
*H01B 3/42* (2006.01)
*C08J 3/09* (2006.01)
*C09D 5/02* (2006.01)

(52) U.S. Cl.
CPC ............... *H01B 3/425* (2013.01); *B05D 1/02* (2013.01); *C08J 3/095* (2013.01); *C09D 5/022* (2013.01); *C09D 135/02* (2013.01); *H01B 19/02* (2013.01); *H01B 19/04* (2013.01); *C08J 2335/02* (2013.01)

(58) Field of Classification Search
CPC ........ H01B 3/425; H01B 19/02; H01B 19/04; B05D 1/02; C08J 3/095; C09D 5/022; C09D 135/02

USPC .................... 427/117, 58; 524/832, 523, 518
See application file for complete search history.

(56) References Cited

U.S. PATENT DOCUMENTS

| 5,369,139 | A | 11/1994 | Boeckeler et al. |
| 5,786,420 | A | 7/1998 | Grandhee |
| 6,080,807 | A | 6/2000 | Campbell |
| 6,380,281 | B1 | 4/2002 | Gooch et al. |
| 6,878,776 | B1* | 4/2005 | Pascault ............... C08F 2/14 525/113 |
| 7,396,882 | B2 | 7/2008 | Hewitt et al. |
| 7,989,135 | B2 | 8/2011 | Zhou et al. |
| 8,772,422 | B2* | 7/2014 | Saxena ................. C08G 77/38 525/474 |
| 2004/0010061 | A1 | 1/2004 | Hewitt et al. |
| 2007/0268564 | A1* | 11/2007 | Chopra ................. G02F 1/167 359/296 |
| 2009/0208864 | A1 | 8/2009 | Zhou et al. |
| 2010/0316947 | A1 | 12/2010 | Mizuhata et al. |
| 2012/0328795 | A1 | 12/2012 | Peeters et al. |

* cited by examiner

*Primary Examiner* — Kelechi C Egwim
(74) *Attorney, Agent, or Firm* — Abel Schillinger, LLP

(57) ABSTRACT

Disclosed are methods of lowering application viscosities of or of reducing or eliminating monomer content in electrical impregnating materials comprising or consisting of an emulsion of an unsaturated polyester or a mixture of unsaturated polyesters, water, at least one radical polymerization initiator or radical polymerization initiator/promoter mixture, at least one surfactant having an HLB-value of greater than 15, optionally at least one reactive diluent, and optionally further additives, a process for preparing zero or low VOC electrical impregnation materials, a method of impregnating electrical or electromechanical devices and a method of increasing the stability of aqueous emulsions of unsaturated polyesters.

20 Claims, No Drawings

EMULSIONS WITH IMPROVED STABILITY

CROSS-REFERENCE TO RELATED APPLICATIONS

The present application is a divisional of U.S. application Ser. No. 14/512,054, filed Oct. 10, 2014, the entire disclosure of which is expressly incorporated by reference herein.

BACKGROUND OF THE INVENTION

1. Field of the Invention

The instant invention relates to compositions for insulating electrical machinery and more particularly to aqueous unsaturated polyester emulsion blends that are thermally or radiation cured.

2. Discussion of Background Information

Organic resin compositions are used as coatings for the mechanical, electrical and environmental-resistance they impart to electromagnetic devices. The coatings provide a mechanical strength, electrical insulation, and environmental protection for improved long-term durability of the devices, as well as increasing the quality of the final product.

Suitable chemistries for the coating resin include, but are not limited to, unsaturated polyesters, epoxies, urethanes, waterborne polyesters, epoxy emulsions, silicones, organic solvent borne alkyds, acrylated and methacrylated urethanes, acrylated and methacrylated epoxies, acrylated and methacrylated polyols, and acrylated and methacrylated vegetable oils.

Many of the chemistries including unsaturated polyester resins (UPE) contain volatile reactive monomers such as styrene, vinyl toluene (VT), acrylates, and diallylphthalate (DAP). Each of these monomers have significant drawbacks in use as electrical insulating varnishes. Styrene and VT have high vapour pressure and low flashpoints leading to environmental and safety concerns. Acrylates carry an unpleasant odor in addition to being expensive and having poor viscosity reduction of the unsaturated polyester resin. DAP also requires very high concentrations to achieve suitable viscosity for impregnation of the electromechanical device such as a rotor or stator in an electric motor. Even with a low vapor pressure monomer such as DAP, volatile organic content (VOC) emissions of 1.3 lbs/gallon are observed. UPE resins also have stability issues with only 6 months of shelf life before increases in viscosity are observed.

Waterborne resins typically contain a co-solvent that adds to the VOC emissions of the system. Waterborne resins are also cured with melamine resins which potentially emits hazardous air pollutants (HAP) such as formaldehyde. Aqueous epoxy emulsions are VOC and HAP free but are very expensive compared to the other chemistries. What is desired is an aqueous coating that is cost effective like an unsaturated polyester but without the VOC and HAPS issues present with current technologies.

Documents that disclose emulsions of unsaturated polyester resin are for example US 2012/0328795 A1, U.S. Pat. Nos. 5,369,139, 5,786,420, 6,080,807, 6,380,281 B1, 7,396, 882 B2, US 2009/0208864 A1, US 2010/0316947 A1. The disclosures of all of these documents and the remaining documents mentioned in the instant specification are expressly incorporated by reference herein in their entireties.

Compositions with low levels of monomer or no monomer usually are very high viscosity materials (7000 cps/7000 mPas) that are not suitable for impregnation of motors/stators.

In view of the foregoing, it would be advantageous to be able to provide compositions, especially for electrical insulation, that offer a wide variety of properties all in conjunction. Specifically, they should have very good storage stability/shelf-life of one year or more, be very cost effective similar to unsaturated polyesters both in preparation and handling, be aqueous compositions showing no VOC and/or HAPS issues, have low enough viscosities without reactive diluents that allow for good application, especially when impregnating electromechanical devices, and at the same time should have chemical/mechanical properties that equal or surpass those of previous compositions.

Other objects are apparent to those skilled in the art from the following discussion of the present invention.

SUMMARY OF THE INVENTION

The present invention provides a method of lowering the application viscosities of electrical impregnating materials to between 2000 mPas and 100 mPas, preferably between 200 mPas and 800 mPas, wherein as electrical impregnation materials zero or low VOC emulsions comprising or consisting of
  a1) an unsaturated polyester or a mixture of unsaturated polyesters,
  a2) water,
  b) at least one initiator for radical polymerisation or initiator for radical polymerisation/promotor mixture,
  c) at least one surfactant having an HLB-value of greater than 15,
  d) optionally at least one reactive diluent, and
  e) optionally further additives
are employed.

The present invention further provides a method of reducing or eliminating monomer content in electrical impregnating materials and at the same time reducing application viscosity to between 2000 mPas and 100 mPas, preferably between 200 mPas and 800 mPas, by employing as electrical impregnation material zero or low VOC emulsions comprising or consisting of
  a1) an unsaturated polyester or a mixture of unsaturated polyesters,
  a2) water,
  b) at least one initiator for radical polymerisation or initiator for radical polymerisation/promotor mixture,
  c) at least one surfactant having an HLB-value of greater than 15,
  d) optionally at least one reactive diluent, and
  e) optionally further additives.

The present invention further provides a method of impregnating or coating electrical or electromechanical devices, comprising the steps of adding a zero or low VOC emulsion to the electromechanical device and curing the applied emulsion, wherein the zero or low VOC emulsion comprises or consists of
  a1) an unsaturated polyester or a mixture of unsaturated polyesters,
  a2) water,
  b) at least one initiator for radical polymerisation or initiator for radical polymerisation/promotor mixture,
  c) at least one surfactant having an HLB-value of greater than 15,
  d) optionally at least one reactive diluent, and
  e) optionally further additives.

In one aspect of the above method, the emulsion may be added to the electromechanical device by any method known in the art, preferably any of the following methods: dipping, spraying, casting, trickling.

In another aspect of this method, the electromechanical device may be a magnet wire.

The present invention also provides low viscosity, zero or low VOC electrical impregnating material comprising or consisting of an emulsion comprising or consisting of
- a1) an unsaturated polyester or a mixture of unsaturated polyesters,
- a2) water,
- b) at least one initiator for radical polymerisation or initiator for radical polymerisation/promotor mixture,
- c) at least one surfactant having an HLB-value of greater than 15,
- d) optionally at least one reactive diluent, and
- e) optionally further additives.

This electrical impregnating material has an application viscosity of from 2000 mPas to 100 mPas, preferably from 200 mPas to 800 mPas.

In one aspect of the above material or any of the above methods, the unsaturated polyester may be selected from dicyclopentadienyl (DCPD) containing resins and/or imide functionality containing resins.

In another aspect of the above material or any of the above methods, the initiator may be selected from dicumylperoxide, t-butylbezoperoxide, and mixtures thereof.

In yet another aspect of the above material or any of the above methods, the reactive diluent may be selected from vinyl monomers, (meth)acrylate monomers, oligomers of these, and mixtures thereof.

In a still further aspect of the above material or any of the above methods, the reactive diluents are selected from DAP, VT, 1,4-butanediol dimethacrylate, propoxylated glyceryl triacrylate, and mixtures thereof.

In another aspect of the above material or any of the above methods, the additives may be selected from additives that impact pH, additives that impact surface smoothness, additives that impact flash rusting and defoaming, additives that impact air release and deforming capabilities, additives that impact surface levelling, and mixtures thereof.

The present invention further provides a process for preparing zero or low VOC electrical impregnating materials by preparing emulsions of unsaturated polyesters comprising or consisting of
- a1) an unsaturated polyester or a mixture of unsaturated polyesters,
- a2) water,
- b) at least one initiator for radical polymerisation or initiator for radical polymerisation/promotor mixture,
- c) at least one surfactant having an HLB-value of greater than 15,
- d) optionally at least one reactive diluent, and
- e) optionally further additives, by mixing the components a1), a2), b), d) and e) to form a homogenous mixture and separately mixing components a2) and c) until homogenous and afterwards adding the unsaturated polyester containing mixture to the water/surfactant mixture under shear mixing, preferably high shear mixing and employing the emulsion for or as electrical impregnating varnishes.

The present invention also provides a method of increasing the stability of aqueous emulsions of unsaturated polyesters comprising or consisting of
- a1) an unsaturated polyester or a mixture of unsaturated polyesters,
- a2) water,
- b) at least one initiator for radical polymerisation or initiator for radical polymerisation/promotor mixture,
- c) at least one surfactant,
- d) optionally, at least one reactive diluent, and
- e) optionally, further additives.

by adding as the at least one surfactant a surfactant having an HLB-value of greater than 15.

DEFINITION OF TERMS

The following description is made for the purpose of illustrating the general principles of the present invention and is not meant to limit the inventive concepts claimed herein. Further particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a", "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

Any indications of quantity given in the instant invention are to be considered as indications of quantity by weight, if not specified otherwise.

In the instant invention the term "room temperature" is intended to mean a temperature of 20° C.; if not specified otherwise, temperature values are to be considered as degrees centigrade (° C.).

In the instant invention the given reactions or process steps are carried out at normal pressure/atmospheric pressure, that is at 1013 mbar.

In the instant invention the term "and/or" includes any and all combinations of one or more of the associated listed items.

In the instant invention the term "(meth)acryl" encompasses "acryl" as well as "methacryl" and also mixtures of both.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the constructions without departing from the scope of the invention, it is intended that all matter contained in the description shall be interpreted as illustrative and not in a limiting sense.

The present invention relates to the application of a novel resin chemistry utilising an aqueous unsaturated polyester resin emulsion. This invention utilises an unsaturated polyester resin with either no monomer or low monomer content. Use of a surfactant with a suitable HLB value gives a stable aqueous emulsion for a VOC/HAPS free coating system. The emulsion is also extremely stable with over one year of shelf-life with no loss in reactivity, hard settling or viscosity increase. The emulsion allows for low application viscosities without the use of reactive diluents.

A first embodiment of the instant invention is a method of lowering the application viscosities of electrical impregnating materials to below 1800 mPas, preferably below 1000 mPas by employing as electrical impregnation materials zero or low VOC emulsions comprising or consisting of
a1) an unsaturated polyester or a mixture of unsaturated polyesters,
a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives.

A second embodiment of the instant invention is a method of reducing or eliminating monomer content in electrical impregnating materials and at the same time reducing application viscosity to between 2000 mPas and 100 mPas, preferably between 200 mPas and 800 mPas, by employing as electrical impregnation material zero or low VOC emulsions comprising or consisting of
a1) an unsaturated polyester or a mixture of unsaturated polyesters,
a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives.

A third embodiment of the instant invention is a method of impregnating or coating electrical or electromechanical devices, comprising the steps of adding a zero or low VOC emulsion to the electromechanical device and curing the applied emulsion, wherein the zero or low VOC emulsion comprises or consists of
a1) an unsaturated polyester or a mixture of unsaturated polyesters,
a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives.

A fourth embodiment of the instant invention is a low viscosity, zero or low VOC electrical impregnating material comprising or consisting of an emulsion comprising or consisting of
a1) an unsaturated polyester or a mixture of unsaturated polyesters,
a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives
the electrical impregnating material having application viscosities of between 2000 mPas and 100 mPas, preferably between 200 mPas and 800 mPas.

Other words for expressing the first to third embodiments are:
Use of zero or low VOC emulsions comprising or consisting of
a1) an unsaturated polyester or a mixture of unsaturated polyesters,
a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives
to lower the application viscosities of electrical impregnating materials to below 1800 mPas, preferably below 1000 mPas, and/or
to reduce or eliminate monomer content in electrical impregnating materials and at the same time reduce application viscosity to between 2000 mPas and 100 mPas, preferably between 200 mPas and 800 mPas, and/or for impregnating or coating electrical or electromechanical devices.

The electrical impregnating materials can also be called varnishes.

The present invention also relates to an emulsion with zero or low VOC comprising or consisting of
a1) an unsaturated polyester or a mixture of unsaturated polyesters, a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives.

In particular these emulsions are wire enamels or impregnating enamels, or, respectively, could be used for such enamels.

The present invention further relates to a process for preparing zero or low VOC emulsions of unsaturated polyesters, preferably comprising or consisting of
a1) an unsaturated polyester or a mixture of unsaturated polyesters,
a2) water,
b) at least one initiator for radical polymerisation or initiator for radical polymerisation/promotor mixture,
c) at least one surfactant having an HLB-value of greater than 15,
d) optionally at least one reactive diluent, and
e) optionally further additives,
by mixing the components a1), a2), b), d) and e) to form a homogenous mixture and
separately mixing a2) and c) until homogenous and afterwards adding the unsaturated polyester containing mixture to the water/surfactant mixture under shear mixing, preferably high shear mixing.

The aqueous emulsions preferably comprise or consist of the mentioned constituents a1) to e).

Consequently, the invention also relates to a process for preparing zero or low VOC electrical impregnating materials by preparing emulsions of unsaturated polyesters as just outlined above and employing these as or for the electrical impregnation material.

Also the invention relates to the use of a surfactant having an HLB-value of greater than 15 to prepare zero or low VOC emulsions of unsaturated polyesters in general.

The present invention further relates to a method of impregnating and/or coating electrical and/or electromechanical devices, comprising the steps of adding an electrical impregnation material or emulsion according to the instant invention to the electrical or electromechanical device and curing the applied emulsion.

In other words, this embodiment relates to the use of an electrical impregnation material or emulsion according to the instant invention for impregnating and/or coating electrical and/or electromechanical devices as well as for preparing wire enamels and impregnating enamels.

The present invention further relates to a method of increasing the stability of aqueous emulsions of unsaturated polyesters, preferably comprising or consisting of a1) an unsaturated polyester or a mixture of unsaturated polyesters,
a2) water,
b) at least one initiator for radical polymerisation or initiator for radical polymerisation/promotor mixture,
c) at least one surfactant,
d) optionally at least one reactive diluent, and
e) optionally further additives, by adding as surfactant a surfactant having an HLB-value of greater than 15.

In other words, this embodiment relates to the use of a surfactant having an HLB-value of greater than 15 to increase the stability of aqueous emulsions of unsaturated polyesters in general. The aqueous emulsions preferably comprise or consist of the mentioned constituents a1) to e).

The present invention provides a composition having an unsaturated polyester resin, initiator and surfactant. A reactive diluent such as a monomer or oligomer can also be included in the above mixture to optimise properties of the cured film. These materials are then emulsified with water to prepare a stable emulsion suitable for impregnation of electromechanical devices.

It is well known how unsaturated polyester resins can be synthesized. The progress of the reaction can be followed by measuring the acid value of the mixture. Glycols are added along with unsaturated diacids that include maleic anhydride and the mixture is heated to 355-430° F. (180-220° C.) with some form of agitation such as stirring. Dicyclopentadiene can also be added with cracking (Diels-Alder chemistry) or under hydrolysis conditions to add to the polymer. Volatiles are removed, preferably by distillation and the acid value (ASTM D1639-90) and viscosity (ASTM D1545-89) of the mixture are monitored until the desired end-point is reached. In addition the reaction with the glycols can be carried out in the presence of oils containing ethylenic unsaturation such as soybean oil. The reaction mixture is cooled and monomer is added to give the desired UPE resins. Inhibitors can be added to the monomer for extending storage stability of the resin. Examples of unsaturated carboxylic acids and corresponding anhydrides useful in the invention include maleic acid, fumaric acid, itaconic acid and maleic anhydride. In addition other acids, anhydrides or esters of the acids can be added to modify the chemical composition. Examples of such acids and anhydrides include phthalic acid, isophthalic acid, terephthalic acid, tetrahydrophthalic anhydride, phthalic anhydride, nadic anhydride, methylnadic anhydride, hexahydrophthalic anhydride, dimethyl terephthalate and the like. Maleic acid and maleic anhydride are preferred.

A wide variety of polyols can be used in the process of the invention. Included would be common diols such as ethylene glycol, propylene glycol, 1,3-propanediol, 1,4-propanediol, 1,4-butanediol, 2,2-dimethyl-1,3-propanediol, 2-methyl-1,3-propanediol, glycol ethers such as diethylene glycol and dipropylene glycol, and polyoxyalkylene glycols like polyoxyethylene glycol and polyoxypropylene glycol. Triols and higher functional polyols such as glycerol, trimethylol propane and oxyalkylated adducts thereof can also be used. Preferably, the polyols are aliphatic or alicyclic and optionally contain C—O—C linkages.

Examples of oils containing unsaturation include castor oil, peanut oil, linseed oil, safflower oil, olive oil, cotton oil, rapeseed oil, soybean oil and tung oil. In addition, fatty acids could be used instead of the oil. An example would be ricinoleic acid instead of castor oil. Modified oils such as epoxidized soybean oil may also be used.

Other materials commonly used in the synthesis of unsaturated polyester resins, such as solvents, isomerization and/or condensation catalyst, promoters, etc. can be used in the process of the invention. Examples of solvents are those commonly known in the art and include but are not limited to hexane, cyclohexane, benzene, toluene, xylene, and mixtures of solvents. Commonly used inhibitors include hydroquinone, p-benzoquinone, di-t-butylhydroquinone, t-butylcatechol, phenothiazine, and the like. Catalysts used to promote the condensation reaction include p-toluene sulfonic acid, methane sulfonic acid, zinc salts (e.g. acetate), organotin compounds (dibutyl tin oxide) and other materials known to those skilled in the art. Isomerisation catalysts include organic amines such as morpholine and piperidine.

Preferred as unsaturated polyester resins are dicyclopentadienyl (DCPD) containing resins and/or imide functionality containing resins. Commercially available examples for these are: Esterlite 605 being a DCPD containing unsaturated polyester resin that is soluble in DAP monomer, Pedigree 70VT being a DCPD containing unsaturated polyester resin that is soluble in VT monomer, Dobeckan MF 8001 and Dobeckan MF 8044 being monomer free resins containing varying amounts of imide functionality.

Unsaturated polyester resins are typically used in combination with an initiating system. Common initiators include peroxides, azo compounds and UV agents. Organic peroxides are the industry standard for polymerising unsaturated polyester resins. Depending on the peroxide structure, cure can be achieved at room temperature to elevated temperatures of 180° C. The desire to cure at low temperature (below 120° C.) is almost uniformly desired. In addition to the obvious energy savings, throughput can be significantly increased by not having to raise the temperature of the article to be cured. Alternate low temperature initiating systems would include diazo compounds as well.

UV curing agents are numerous. One can tune the reactivity based on the emitter wave length one desires to cure at. Some common UV curing agents include Diphenyl(2,4,6-trimethylbenzoyl)-phosphine oxide (TPO) and Benzophenone.

The most common initiator used in electrical insulating systems is peroxides such as dicumylperoxide (DiCup) and t-butylbenzoperoxide (TBP). Typical loading levels are 0.5 to 4% based on unsaturated polyester-reactive monomer weights. More preferably is the use of 1-2% initiator to UPE-monomer blends. This offers a good mixture of reactivity to stability.

Preferred initiators according to the instant invention are those selected from dicumylperoxide, t-butylbenzoperoxide and mixtures thereof.

In some embodiments of the instant invention instead of only an initiator a mixture of initiator and promotor can be used.

Promoters can also be used in combination with peroxides to lower the cure temperature. It is common practice to use promoters, such as cobalt, iron, and manganese derivatives to accelerate cure at low temperature. Amine, acetoacetates and amides are also used in combination with metals such as cobalt to promote peroxide decomposition and give a high radical flux needed for cure.

Reactive diluents such as monomers and or oligomers can be added to the UPE resin to aid with flow and film formation. Typically UPE resins contain 30-50% by weight monomer (reactive diluent) content (based on the added amounts of UPE resin and reactive diluents) to allow workable application viscosity. Application viscosities of 50-3000 mPas (cP) are typical in the industry, most preferred being 100-800 mPas (cP). The amount of reactive diluent is more than is typically needed in producing good film formation but is required to reduce the resin viscosity. Much of the reactive diluent can be lost on curing at elevated temperature due to the low vapour pressure. UPE emulsions allow the use of much reduced levels of reactive diluents. Reactive diluents such as styrene, vinyl toluene (VT), and diallyl phthalate (DAP) are commonly used vinyl reactants. Common acrylates would include phenoxyethylacrylate, butanediol dimethacrylate, trimethylolpropane triacrylate or glycerylethoxylate triacrylate. Other acrylates could also be easily substituted and mixtures of acrylates and vinyl reactants could also be used.

Reactive diluent monomers and oligomers can also be comprised of urethane acrylates, epoxy acrylates, urethane methacrylates, epoxy methacrylates, polyester acrylates, polyether acrylates, polyester methacrylates and polyether methacrylates.

Preferred reactive diluents within the context of the instant invention are those selected from DAP, VT, 1,4-butanediol dimethacrylate (SR 214 from Sartomer), propoxylated glyceryl triacrylate (SR 9020 from Sartomer), and mixtures thereof.

The surfactants that can be used in the process must generally satisfy several criteria.

First, the surfactant must be capable of interacting with the unsaturated polyester resin molecules to enable their dispersion in an aqueous media at the temperatures encountered during the emulsification process, and maintain such dispersion at room temperatures.

Second, the surfactants must be stable at the temperatures reached in the mixer during the emulsification process.

Further, for polyester emulsions used in electrical insulation impregnation compositions, the surfactants preferably have a vaporisation point below the temperatures encountered in the drying/curing of the electromechanical device.

To meet these criteria, the surfactants used in the present invention preferably are ethoxylated-polyether and/or ethylene oxide and/or propylene oxide surfactants having HLB values of greater than 14, and molecular weights greater than 5,000 (weight average). A particularly preferred example of which is an ethylene oxide and/or propylene oxide surfactant having an HLB value of 16-20 in an amount sufficient to obtain the desired emulsion. Typically, surfactant loadings of from about 3% by weight to about 15% by weight of the polyester resin (i.e., to 100 parts resin, 3 to 15 parts of surfactant would be added) are sufficient.

Examples of commercially available especially useful surfactants are ELAN-Plus® 71-0A01 having an HLB-value of 18 and Igepal® DM 970 having an HLB-value of 19.

In one preferred embodiment the surfactant does not have ethylenically unsaturated groups.

Additives that impact pH, surface smoothness, flash rusting and defoaming for example can also be added to the system prior to emulsification or after the emulsion has been formed. Some UPE resins give acidic solutions that could be problematic to carbon steel surfaces. The pH can be modified by common bases such as amines. For example, triethylamine or 2-aminomethylpropanol (2-AMP) could be added to raise pH and also improve the flash rusting of aqueous materials. A variety of specialty chemicals have also been shown to improve coating appearance. Silicones and polyacrylates are known to provide air release and deforming capabilities as well as surface levelling.

The amount of water used in the emulsion can vary from about 10 percent to about 90% by weight of the total emulsified composition. Preferably, water is present in an amount of at least 20 percent by weight and not in excess of about 60 percent by weight of the total emulsified composition. More preferably, water is present in an amount between about 30% and 50% by weight of the total emulsified composition.

While ordinary tap water is usually suitable for making emulsions, it is desirable to avoid water of high hardness. Some cations, particularly iron, may cause a decrease in emulsion stability. Deionized or distilled water is preferred.

The unsaturated polyester resin, reactive diluent, additives, and initiator are mixed to form a homogeneous mixture prior to emulsification. The mixture can be heated to reduce viscosity if needed. In a separate vessel the surfactant is added to the water and mixed until homogeneous. The unsaturated polyester resin mixture is slowly added to the water/surfactant mixture under high shear mixing. Typically a cowles blade is used but other forms of high shear mixing will work as well. This material is then subjected to a high shear environment until the desired particle size is obtained (Emulsions are typically characterized by particle size, it is a measure of the oil phase volume in the continuous water phase). High shear means a sufficient shear force is used to form a stable emulsion from the materials. The actual shear necessary to create such an emulsion will be dependent on variables such as vessel size, blade, and materials present as is readily known to the skilled artisan.

Emulsification can also be created by using medium or high pressure homogenisation techniques. The pressure can be varied to achieve the emulsion size necessary for a stable aqueous emulsion. Any mixing device capable of generating sufficient shear to form an emulsion can be used in the process of the invention. Preferred mixing devices are variable shear mixers that have a heated or heatable mixing chamber. An example of a suitable mixer is a Meyers mixer equipped with two or more shear blades and a sweep blade that wipes down the sides and bottom of the mixing chamber.

The instant invention's compositions are very well suited for electrical insulation and offer a wide variety of properties all in conjunction. They have very good storage stability/shelf-life of more than a year. They are very cost effective similar to unsaturated polyesters both in preparation and handling. They are aqueous compositions showing no VOC and/or HAPS issues. They have viscosities that allow for good application, especially when impregnating electrical or electromechanical devices, especially motors/stators, or coating such without the necessity to add reactive diluents (though this might be done if desired). They additionally allow for very good diffusion into motor windings. They have chemical/mechanical properties that equal or surpass those of previous compositions.

The electrochemical devices which can be impregnated or coated according to the instant invention can be any known in the art, preferably magnet wire.

The various embodiments of the instant invention, including those of the dependent claims, can be combined with each other in any desired manner.

The invention will now be explained by way of the following non-limiting examples.

Example 1

ELAN-Plus™ 71-0A01 (84 g of 35% surfactant in water) and 344 g of de-ionized water were added to a reactor and mixed for 30 minutes. In another reactor 336 g of unsaturated polyester Esterlite 605, 6 g of Dicumyl peroxide and 264 g of monomer DAP were heated to a temperature of 100° F. (38° C.) with continuous mixing. The unsaturated polyester solution was slowly added to the surfactant solution and mixed for half an hour. The pre-emulsion solution was then homogenised with an Eppenbach Homo-mixer until the particle size was less than one micron. Dynamic light scattering with a Malvern Mastersizer 3000 was used to measure the particle size. Viscosity was measured at 25° C. by Brookfield viscometer. The bond strength was measured on an Instron using the 3-point break method at 25° C. using ASTM D2519. Magnet wire (MW35) was formed into tight helical coils, dipped into the resin solution and cured in an oven for 2 hours at 150° C. Excellent bond strength of 23 lbs (10.43 kg) was observed. The Dielectric strength was measured on coated metal panels using ASTM D149, by increasing the voltage at 500 volts/second rate, until breakdown occurs. The various (physical, mechanical, electrical properties) characteristic properties of this unsaturated polyester emulsion material are presented in table 2.

Examples 2 to 5

The same procedure as in Example 1 was repeated except that the amounts of the polyester and the monomer used were varied according to the formulation as shown in Table 1. The various (physical, mechanical, electrical properties) characteristic properties of these unsaturated polyester emulsion materials are presented in Table 2.

As can be seen in Examples 1-5, low levels of monomer can be used with an unsaturated polyester resin to achieve good film build and acceptable bond strength. The emulsion stability was checked after one year of room temperature ageing and found to be unchanged in emulsion particle size and physical bond strength characteristics.

TABLE 1

|  | Example 1 | Example 2 | Example 3 | Example 4 | Example 5 |
|---|---|---|---|---|---|
|  | Weights of raw materials charged (g) | | | | |
| Surfactant | 86 | 86 | 86 | 86 | 86 |
| De-ionized water | 344 | 344 | 344 | 344 | 344 |
| Polyester Esterlite 605 | 336 | 396 | 456 | 516 | 576 |
| Monomer/oligomer | 264 | 204 | 144 | 84 | 24 |

TABLE 2

|  | Example 1 | Example 2 | Example 3 | Example 4 | Example 5 |
|---|---|---|---|---|---|
| DAP:Resin | 44:56 | 34:66 | 24:76 | 14:86 | 1:99 |
| Particle size | 0.50 | 0.35 | 0.44 | 0.54 | 0.65 |
| Solids | 54.8 | 56.2 | 56.2 | 56.1 | 57.3 |
| Viscosity (cp)(mPas) | 760 | 780 | 490 | 400 | 640 |
| Bond Strength (lbs)* | 22.9/9.54 (10.39/4.33) | 24.1/9.52 (10.93/4.32) | 24.3/8.15 (11.02/3.7) | 19.9/4.01 (9.03/1.82) | 24.4/2.73 (11.07/1.24) |
| Dielectric Strength (Volts/mil) | 4454/3594** | 4256/3448** | 3561/2924** | 2905/2470** | 2617/2575** |

*Bond strengths: HC, 25° C./150° C., Curing: 2 h @ 150° C., double dip; values in brackets indicate the values converted into kilograms
**After 24 h in water.

Examples 6 and 7

The same procedure as in Example 1 was repeated except that the amounts of the polyester and the monomer used were varied according to the formulation as shown in Table 3.

The various (physical, mechanical, electrical properties) characteristic properties of these unsaturated polyester emulsion materials are presented in Table 4.

As was demonstrated in Examples 1-7, various commercially available unsaturated polyester resins (Esterlite 605 and Pedigree 70VT) can be utilised to make emulsions that are stable and achieve adequate film formation/bond strength. Different monomers were also successful including VT and DAP.

TABLE 3

|  | Example 6 | Example 7 |
|---|---|---|
|  | Weights of raw materials charged (g) | |
| Surfactant | 86 | 86 |
| De-ionized water | 344 | 344 |
| Polyester 70VT | 480 | 540 |
| Monomer/oligomer | 120 | 60 |

TABLE 4

|  | Example 6 | Example 7 |
|---|---|---|
| VT:Resin | 20:80 | 10:90 |
| Particle size | 1.02 | 1.64 |
| Solids | 51.52 | 55.2 |
| Viscosity (cP) | 290 | 240 |
| Bond Strength (lbs)* | 27.2/3.51 (12.34/1.59) | 33.6/4.35 (15.24/1.97) |

*Bond strengths: HC, 25° C./150° C., curing: 2 h @ 150° C., double dip; values in brackets indicate the values converted into kilograms Example 8

ELAN-Plus™ 71-0A01 (84 g of 35% surfactant in water) and 344 g of de-ionized water were added to a reactor and mixed for 30 minutes. In another reactor 600 g of monomer free unsaturated polyester Dobeckan MF8044 was heated to a temperature of 100° F. (38° C.) with continuous mixing. The unsaturated polyester solution was slowly added to the surfactant solution and mixed for half an hour. The pre-emulsion solution was then homogenized with an Eppenbach Homo-mixer until the particle size was less than one micron. Viscosity was measured at 25° C. by Brookfield viscometer. The bond strength was measured on an Instron using the 3-point break method at 25° C. using ASTM D2519. Magnet wire (MW35) was formed into tight helical coils, dipped into the resin solution and cured in an oven for 2 hours at 150° C. The Dielectric strength was measured on coated metal panels using ASTM D149, by increasing the voltage @ 500 volts/second rate, until breakdown occurs. The various (physical, mechanical, electrical properties) characteristic properties of this unsaturated polyester emulsion material are presented in Table 5.

Example 9

The same procedure as in Example 8 was repeated except that the type of the polyester (Dobeckan MF 8001) used was different.

The various characteristic properties of these unsaturated polyester emulsion materials are presented in Table 5. Examples 8 and 9 demonstrate that the emulsion technology is also applicable to monomer free resins such as MF 8044 and ME 8001.

TABLE 5

|  | Example 8 | Example 9 |
|---|---|---|
| Resin | MF 8044 | MF 8001 |
| Particle size | 2.8 | 3.1 |
| Solids | 48.3 | 56.3 |
| Viscosity (cP) | 250 | 371 |
| Bond Strength (lbs) | 12.75/2.31* (5.78/1.05) | 11.92/2.18* (5.41/0.99) |
|  | 58.6/16.0** (26.58/7.26) | 56.12/11.7** (25.46/5.31) |
| Dielectric Strength (Volts/mil) | 3476 | 3804 |

Bond strengths:
* HC, 25° C./150° C., curing: 2 h @ 150° C., double dip; values in brackets indicate the values converted into kilograms
** TC, 25° C./150° C., curing: 2 h @ 150° C., double dip; values in brackets indicate the values converted into kilograms

Example 10

ELAN-Plus™ 71-0A01 (84 g of 35% surfactant in water) and 344 g of de-ionized water were added to a reactor and mixed for 30 minutes. In another reactor 540 g of unsaturated polyester Esterlite 605, 6 g of Dicumyl peroxide and 60 g of monomer SR214 were heated to a temperature of 100° F. (38° C.) with continuous mixing. The unsaturated polyester solution was slowly added to the surfactant solution and mixed for half an hour. The pre-emulsion solution was then homogenized with an Eppenbach Homo-mixer until the particle size was less than one micron. Viscosity was measured at 25° C. by Brookfield viscometer. The bond strength was measured on an Instron using the 3-point break method at 25° C. using ASTM D2519. Magnet wire (MW35) was formed into tight helical coils, dipped into the resin solution and cured in an oven for 2 hours at 150° C. Excellent bond strength of 35 lbs. (15.88 kg) was observed. The various (physical, mechanical, electrical properties) characteristic properties of this unsaturated polyester emulsion material are presented in Table 7.

Examples 11 to 13

The same procedure as in Example 10 was repeated except that the amounts of the polyester and the monomer/oligomer used were varied according to the formulation as shown in Table 6. The various characteristic properties of these unsaturated polyester emulsion materials are presented in Table 7.

Examples 10 to 13 demonstrate that various monomers/oligomers, including acrylates, can be used in combination with an unsaturated polyester resin to achieve good emulsion stability and adequate film formation and bond strength.

TABLE 6

|  | Example 10 | Example 11 | Example 12 | Example 13 |
|---|---|---|---|---|
|  | Weights of raw materials charged (g) | | | |
| Surfactant | 86 | 86 | 86 | 86 |
| De-ionized water | 344 | 344 | 344 | 344 |
| Polyester | 540 | 480 | 540 | 480 |
| Monomer | 60 | 120 | 60 | 120 |
| SR214/SR9020 | SR9020 | SR9020 | SR214 | SR214 |

TABLE 7

|  | Example 10 | Example 11 | Example 12 | Example 13 |
|---|---|---|---|---|
| Monomer:Resin | 10:90 | 20:80 | 10:90 | 20:80 |
|  | SR9020 | SR9020 | SR214 | SR214 |
| Particle size | 0.57 | 0.48 | 0.53 | 0.39 |
| Solids | 57.4 | 56.8 | 54.6 | 55.0 |
| Viscosity (cP) | 555 | 420 | 390 | 470 |
| Bond Strength (lbs)* | 21.0/3.0* | 19.3/3.2* | 19.3/1.4* | 14.0/1.99* |
|  | (9.53/1.36) | (8.75/1.45) | (8.75/0.64) | (6.35/0.90) |
|  | 35.5/3.5** | 34.2/6.9** | 28.9/3.4** | 28.2/3.2** |
|  | (16.1/1.59) | (15.51/3.13) | (13.11/1.54) | (12.79/1.45) |

Bond strengths:
* HC, 25° C./150° C., Curing: 2 h @ 150° C., double dip; values in brackets indicate the values converted into kilograms
** HC, 25° C./150° C., Curing: 2 h @ 175° C., double dip; values in brackets indicate the values converted into kilograms

Examples 14 to 16

The same procedure as in Example 10 was repeated except that the type of the surfactant used was different as shown in Table 8. As can be seen in the examples below, HLB values greater than 15 give suitable emulsions of unsaturated polyester resins while surfactants with HLB values of 15 or less do not emulsify unsaturated polyester resins.

TABLE 8

|  | Example 10 | Example 14 | Example 15 | Example 16 |
|---|---|---|---|---|
| Surfactant | ELAN-Plus™ 71-0A01 (ethoxylated polyether resin) | IGEPAL CO-630 (Polyoxyethylene (9) nonylphenylether, branched) | BRIJ O20 (ethoxylated (20) natural fatty alcohol, based on Oleyl alcohol) | IGEPAL DM 970 (Polyoxyethylene (150) dinonylphenyl ether) |
| HLB value | 18 | 13 | 15 | 19 |
| Particle size (μm) | 0.2 | Not emulsified | Not emulsified | 0.2 |

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of impregnating or coating an electrical or electromechanical device, wherein the method comprises adding a low VOC emulsion to the electromechanical device and curing the applied emulsion, the low VOC emulsion comprising
   a1) an unsaturated polyester or a mixture of unsaturated polyesters,
   a2) water,
   b) at least one radical polymerisation initiator or a mixture of radical polymerisation initiator and promoter,
   c) at least one surfactant having an HLB-value of greater than 15,
   d) optionally, at least one reactive diluent, and
   e) optionally, further additives.

2. The method of claim 1, wherein the emulsion is added to the electromechanical device by at least one of dipping, spraying, casting, trickling.

3. The method of claim 1, wherein the electromechanical device is a magnet wire.

4. The method of claim 1, wherein a1) comprises one or more resins selected from dicyclopentadienyl (DCPD) containing resins, imide functionality containing resins, and mixtures thereof.

5. The method of claim 1, wherein the initiator is selected from dicumylperoxide, t-butylbenzoperoxide, and mixtures thereof.

6. The method of claim 1, wherein herein the reactive diluent is selected from vinyl monomers, (meth)acrylate monomers, oligomers of these, and mixtures thereof.

7. The method of claim 1, wherein the reactive diluent is selected from DAP, VT, 1,4-butanediol dimethacrylate, propoxylated glyceryl triacrylate, and mixtures thereof.

8. The method of claim 1, wherein the emulsion has a viscosity of from 2000 mPas to 100 mPas.

9. The method of claim 8, wherein the viscosity is from 200 mPas to 800 mPas.

10. The method of claim 1, wherein a1) comprises a dicyclopentadienyl (DCPD) containing resin.

11. The method of claim 1, wherein a1) comprises an imide functionality containing resin.

12. The method of claim 1, wherein the emulsion comprises from 0.5% to 4% by weight of b), based on the weight of a1).

13. The method of claim 1, wherein the emulsion comprises from 1% to 2% by weight of b), based on the weight of a1).

14. The method of claim 1, wherein the emulsion comprises from 30% to 50% by weight of d), based on the combined weight of a1) and d).

15. The method of claim 1, wherein c) comprises an ethoxylated polyether and/or an ethylene oxide and/or propylene oxide surfactant.

16. The method of claim 1, wherein c) comprises an ethylene oxide and/or propylene oxide surfactant having an HLB value of from 16 to 20.

17. The method of claim 1, wherein c) does not comprise a surfactant with ethylenically unsaturated groups.

18. The method of claim 1, wherein the emulsion comprises from 3% to 15% by weight of c), based on the weight of a1).

19. The method of claim 1, wherein the emulsion comprises from 20% to 60% by weight of water, based on a total weight of the emulsion.

20. The method of claim 1, wherein the emulsion consists of
   a1) an unsaturated polyester or a mixture of unsaturated polyesters,
   a2) water,
   b) at least one radical polymerisation initiator or a mixture of radical polymerisation initiator and promoter,
   c) at least one surfactant having an HLB-value of greater than 15, and
   d) optionally, at least one reactive diluent.

* * * * *